(12) United States Patent
North et al.

(10) Patent No.: US 9,553,736 B2
(45) Date of Patent: *Jan. 24, 2017

(54) AGGREGATING DATA TRAFFIC FROM ACCESS DOMAINS

(71) Applicant: Cisco Technology, Inc., San Jose, CA (US)

(72) Inventors: Christopher M. North, Harpenden (GB); Simon P. Chatterjee, London (GB); Dezhong Cai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 615 days.

This patent is subject to a terminal disclaimer.

(21) Appl. No.: 14/021,569

(22) Filed: Sep. 9, 2013

(65) Prior Publication Data

US 2014/0010091 A1    Jan. 9, 2014

Related U.S. Application Data

(63) Continuation of application No. 12/732,865, filed on Mar. 26, 2010, now Pat. No. 8,537,720.

(51) Int. Cl.
*H04L 12/28* (2006.01)
*H04L 12/44* (2006.01)
(Continued)

(52) U.S. Cl.
CPC .............. *H04L 12/44* (2013.01); *H04L 45/02* (2013.01); *H04L 45/04* (2013.01); *H04L 45/28* (2013.01);
(Continued)

(58) Field of Classification Search
CPC ........ H04L 12/44; H04L 12/462; H04L 45/02; H04L 45/04; H04L 45/28; H04L 45/48; H04L 47/125

See application file for complete search history.

(56) References Cited

U.S. PATENT DOCUMENTS 6,157,647 A    12/2000  Husak
6,188,694 B1    2/2001  Fine et al.
(Continued)

FOREIGN PATENT DOCUMENTS

| CN | 1866911 A | 11/2006 | ............. H04L 12/56 |
| CN | 101151852 A | 3/2008 | ............. H04L 12/56 |
| WO | WO 2006/130279 A1 | 12/2006 | |

OTHER PUBLICATIONS

PCT Notification of Transmittal of the International Search Report and the Written Opinion of the International Searching Authority, or the Declaration, mailed May 30, 2011, regarding PCT/US2011/029387 filed Mar. 22, 2011, 13 pages.
(Continued)

*Primary Examiner* — Jutai Kao
(74) *Attorney, Agent, or Firm* — Baker Botts L.L.P.

(57) ABSTRACT

According to one embodiment, a first message identifying a best root node of a spanning tree may be generated. The spanning tree may be implemented by an access domain. The message may be generated independently of a spanning tree protocol instance. The first aggregation node may transmit the first message to a plurality of access nodes of the access domain. Data traffic from the plurality of access nodes may be received. Each access node of the plurality of access nodes may implement a spanning tree protocol instance that selects the best root node as a root node of the spanning tree. The data traffic may be aggregated with other data traffic of a plurality of access domains, and the aggregated data traffic transmitted to an aggregation network.

27 Claims, 4 Drawing Sheets

(51) Int. Cl.
*H04L 12/751* (2013.01)
*H04L 12/715* (2013.01)
*H04L 12/703* (2013.01)
*H04L 12/753* (2013.01)
*H04L 12/803* (2013.01)
*H04L 12/46* (2006.01)

(52) U.S. Cl.
CPC ............. *H04L 45/48* (2013.01); *H04L 47/125* (2013.01); *H04L 12/462* (2013.01)

(56) References Cited

U.S. PATENT DOCUMENTS

| | | | |
|---|---|---|---|
| 6,407,991 B1 * | 6/2002 | Meier | G06F 15/0225 370/338 |
| 6,937,576 B1 | 8/2005 | De Benedetto et al. | |
| 7,577,143 B1 | 8/2009 | Kompella | |
| 7,657,619 B1 | 2/2010 | Yang | |
| 7,672,314 B2 | 3/2010 | Elangovan | |
| 8,537,720 B2 * | 9/2013 | North | H04L 45/02 370/221 |
| 2003/0126299 A1 * | 7/2003 | Shah-Heydari | H04L 45/48 709/252 |
| 2003/0161275 A1 | 8/2003 | Malhotra et al. | |
| 2004/0228335 A1 | 11/2004 | Park et al. | |
| 2005/0097223 A1 | 5/2005 | Shen et al. | |
| 2006/0251101 A1 | 11/2006 | Zhang et al. | |
| 2006/0268749 A1 | 11/2006 | Rahman et al. | |
| 2007/0177525 A1 | 8/2007 | Wijnands et al. | |
| 2008/0089246 A1 * | 4/2008 | Ghanwani | H04L 12/462 370/256 |
| 2008/0186968 A1 | 8/2008 | Farinacci et al. | |
| 2008/0225875 A1 | 9/2008 | Wray et al. | |
| 2009/0260083 A1 | 10/2009 | Szeto et al. | |
| 2010/0110880 A1 | 5/2010 | Kulkarni et al. | |
| 2011/0119748 A1 | 5/2011 | Edwards et al. | |
| 2012/0063396 A1 | 3/2012 | Rayment et al. | |

OTHER PUBLICATIONS

"Understanding Multiple Spanning Tree Protocol (802.1s)" Cisco, http://www.cisco.com/en/US/tech/tk389/tk62/technologies_white_paper09186a0080094cfc.shtml, 10 pages, last updated Apr. 17, 2007.

"Spanning tree protocol", Wikipedia, http://web.archive.org/web/20071012170214/http://en.wikipedia.org/wiki/Spanning_tree_protocol, 7 pages, archived Oct. 12, 2007.

"Data Center Infrastructure Design Guide 2.5", published by Cisco on Dec. 2007, www.cisco.com/application/pdf/en/us/guest/netsol/ns107/c649/ccmigration_09186a008073377d.pdf.

"Data Center High Availability Clusters Design Guide", published by Cisco on Feb. 20, 2006, www.cisco.com/en/US/docs/solutions/Enterprise/Data_Center/HA_Clusters.html.

RFC 3931 standard entitled "Layer Two Tunneling Protocol—Version 3", by J. Lau, et al., Mar. 2005.

RFC 4761 standard entitled "Virtual Private LAN Service (VPLS) Using BGP for Auto-Discovery and Signaling" by K. Kompella, et al., Jan. 2007.

RFC 4762 standard entitled "Virtual Private LAN Service (VPLS) Using Label distribution Protocol (LDP) Signaling" by M. Lasserre, et al., Jan. 2007.

"Data Center-Site Selection for Business Continuance", published by Cisco, www.cisco.com/en/US/docs/solutions/Enterprise/Data_Center/dcstslt.html, 1992.

State Intellectual Property Office of the People's Republic of China, Chinese Office Action and English Translation of Text of the First Office Action—Application No. 2011 80015882.3, Ser. No. 2014 062601067320; ref. file No. 062891.3867 (13 pgs), Jul. 1, 2014.

* cited by examiner

AGGREGATING DATA TRAFFIC FROM ACCESS DOMAINS

CROSS REFERENCE TO RELATED APPLICATION

This application is a continuation of U.S. application Ser. No. 12/732,865, filed Mar. 26, 2010, by Christopher M. North et al. and entitled "Aggregating Data Traffic From Access Domains".

TECHNICAL FIELD

The present disclosure relates generally to telecommunications and more specifically to aggregating data traffic from access domains.

BACKGROUND

An aggregation node may aggregate traffic from a plurality of access domains. An access domain may use a spanning tree protocol to facilitate traffic flow. In general, a spanning tree protocol provides a loop-free topology for a bridged local area network (LAN).

DESCRIPTION OF EXAMPLE EMBODIMENTS

Overview

According to one embodiment, a first message identifying a best root node of a spanning tree may be generated. The spanning tree may be implemented by an access domain. The message may be generated independently of a spanning tree protocol instance. The first aggregation node may transmit the first message to a plurality of access nodes of the access domain. Data traffic from the plurality of access nodes may be received. Each access node of the plurality of access nodes may implement a spanning tree protocol instance that selects the best root node as a root node of the spanning tree. The data traffic may be aggregated with other data traffic of a plurality of access domains, and the aggregated data traffic transmitted to an aggregation network.

Description

Figure 1:
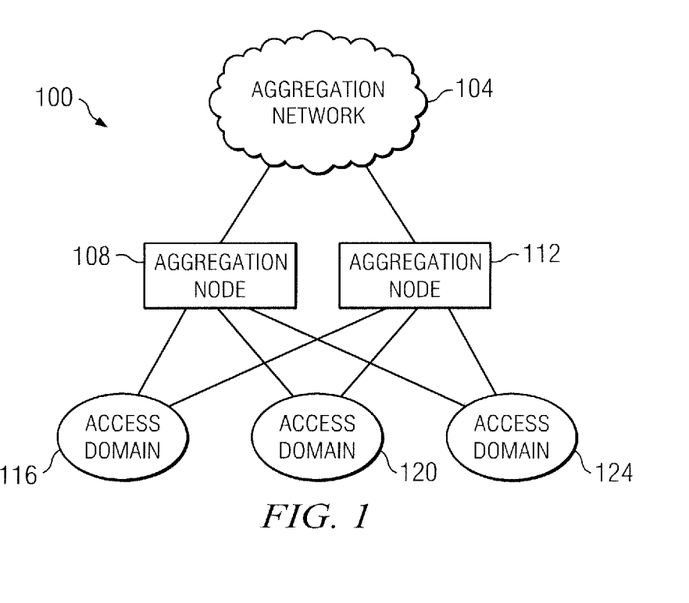
FIG. 1 illustrates an exemplary network for communicating data traffic.

FIG. 1 illustrates an embodiment of a network 100 that comprises aggregation nodes 108 and 112 operable to aggregate data traffic of a plurality of access domains 116-124 and transmit the traffic to aggregation network 104. In general, aggregation network 104 may be a network of computing devices, such as the Internet or other suitable network, and may comprise elements operable to communicate with nodes of access domains 116-124. In general, access domains 116-124 may each comprise a plurality of access nodes that couple one or more devices to network 100. In certain embodiments, an access domain 116 may comprise a bridged local area network (LAN).

Aggregation nodes 108 and 112 may be operable to aggregate traffic from any suitable number of access domains, such as five to ten, ten to fifty, fifty to one hundred, or greater than one hundred access domains. In general, aggregating data traffic may involve combining data traffic from a plurality of sources. The aggregation nodes 108 and 112 may also be operable to route data traffic between aggregation network 104 and access domains 116-124. In some embodiments, the traffic of access domains 116-124 is routed through aggregation node 108 and aggregation node 112 functions as a backup aggregation node. That is, if aggregation node 108 becomes unavailable, aggregation node 112 may perform the routing functions of aggregation node 108. In certain embodiments, aggregation nodes 108 and 112 may comprise routers, such as edge routers.

In an embodiment, an aggregation node 108 may aggregate data traffic of a plurality of access domains 116-124 that each implement a spanning tree. In such an embodiment, aggregation nodes 108 and 112 may participate in the spanning tree implementations to route data. For example, aggregation node 108 may participate by implementing a spanning tree protocol instance for each access domain 116-124 to which it is connected, implementing one large spanning tree network across some or all of the access domains 116-124, or passively relaying spanning tree protocol messages between the access nodes of each access domain 116-124.

In certain situations, however, a large spanning tree may be difficult to maintain. Multiple spanning tree protocol instances at the aggregation nodes may require excessive processing and memory resources. Passive relaying of spanning tree protocol messages may result in excessive delays resulting from certain topology changes. These approaches may also lack compatibility with Resilient Ethernet Protocol (REP) and may suffer from blackholing when a failed aggregation node that is configured to be the root of a spanning tree becomes available again.

In certain embodiments, one or more aggregation nodes (such as aggregation nodes 108 and 112) may participate in a spanning tree implementation of one or more access domains (such as access domains 116-124) without incurring the overhead associated with implementing one or more instances of a spanning tree protocol. In these embodiments, access nodes of an access domain 116 may implement spanning tree protocol instances as if the aggregation node 108 was also implementing a spanning tree protocol instance for the access domain 116. In the embodiments, an aggregation node 108 may participate in a spanning tree implementation by sending root suitability information and/or topology change information in spanning tree protocol messages. For example, aggregation node 108 may send a protocol message to an access domain 116 that identifies the suitability of the aggregation node to serve as the root node of a spanning tree implemented by an access domain 116. As another example, aggregation node 108 may send a message to access domain 116 that indicates that a topology change has occurred in access domain 116. Such participation allows the access domains 116-124 to implement spanning trees without requiring one or more spanning tree protocol instances at the aggregation nodes 108 and 112.

Figure 2:
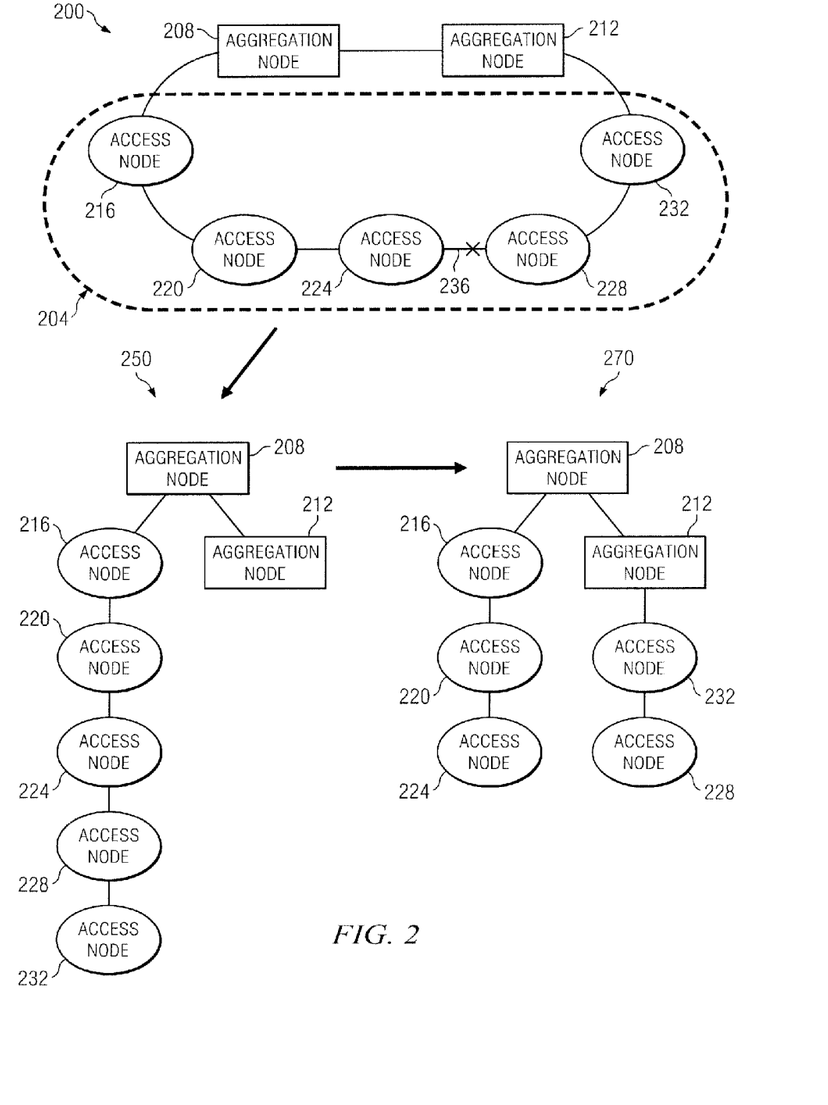
FIG. 2 illustrates an exemplary ring network and corresponding spanning tree.

FIG. 2 illustrates an exemplary network 200 and a corresponding spanning tree 250. In the illustration, exemplary network 200 is a ring network in which one or more access nodes 216-232 of an access domain 204 are coupled to aggregation node 208 and/or 212. In certain embodiments, access domain 204 may correspond to an access domain (such as access domain 116) of FIG. 1. In the illustrated example, access domain 204 comprises access nodes 216-232 coupled as shown. In certain embodiments, the access nodes 216-232 may couple one or more devices to network 200. In some embodiments, the access nodes may comprise wireless access points, routers, gateways, and/or other suitable devices. In certain embodiments, aggregation nodes 208 and 212 may correspond to aggregation nodes 108 and 112.

Spanning tree 250 is an exemplary embodiment of a spanning tree of network 200. In an embodiment, one or more access domains (such as access domain 204) may each implement a spanning tree. Implementation of a spanning tree by an access domain 204 may comprise implementation of an instance of a spanning tree protocol by each node of a plurality of nodes (such as access nodes 216-232) of the access domain 204. In general, a spanning tree protocol instance comprises a spanning tree state machine that facilitates spanning tree protocol operations. Examples of operations include sending and processing spanning tree protocol messages, selecting a root node of the spanning tree, selecting a path from an access node to the root node, and/or blocking unused physical links. The instance may comprise software, hardware, or a combination of both. In general, a spanning tree protocol may be Spanning Tree Protocol, Multiple Spanning Tree Protocol, Rapid Spanning Tree Protocol, Per-VLAN Spanning Tree, Rapid Per-VLAN Spanning Tree, or other suitable protocol that defines implementation of a spanning tree. Collectively, the spanning tree protocol instances of the access nodes 216-232 define a spanning tree 250 of network 200.

In the illustrated example, spanning tree 250 comprises a root node 208, tree nodes 212-232, and loop free, least cost paths from each tree node to the root node. Each spanning tree protocol instance may select a root node, such as root node 208 of the spanning tree 250. In an embodiment, a virtual node of aggregation network 108 could also be the root node of spanning tree 250 (not expressly shown).

In general, spanning tree protocol messages of an access node 216 are generated by a spanning tree state machine of the access node 216. These messages may communicate topology information. Examples of topology information include the suitability of a network node to function as the root node of a network 200, a topology change of the network, the cost of a path between nodes of the network, and/or other information that facilitates communication in the network. In certain embodiments, a spanning tree protocol message may comprise a bridge protocol data unit (BPDU).

In certain embodiments, each access node (such as access node 224) that implements a spanning tree protocol instance may identify the root node 208 of the spanning tree 250 and a least cost path from the access node 224 to the root node 208. Each tree node of the spanning tree may send data traffic addressed to a different network (such as aggregation network 104 or other access domain 120) across the least cost path to the root node 208. In order to avoid loops in network 200, access nodes implementing the spanning tree 250 may disable physical links to other access nodes that are not used to send data traffic, i.e., physical links that are not included in the least cost paths of the spanning tree 250. For example, one or more physical links 236 between access nodes 224 and 228 may be disabled.

In some embodiments, the access domains may initially configure the spanning tree such that aggregation node 212 is not included in a least cost path from an access node of access domain 204 to aggregation node 208. In some embodiments, if physical link 236 becomes disabled after spanning tree 250 is configured, the spanning tree may be reconfigured. Spanning tree 270 depicts a spanning tree formed after physical link 236 is disabled.

Figure 3:
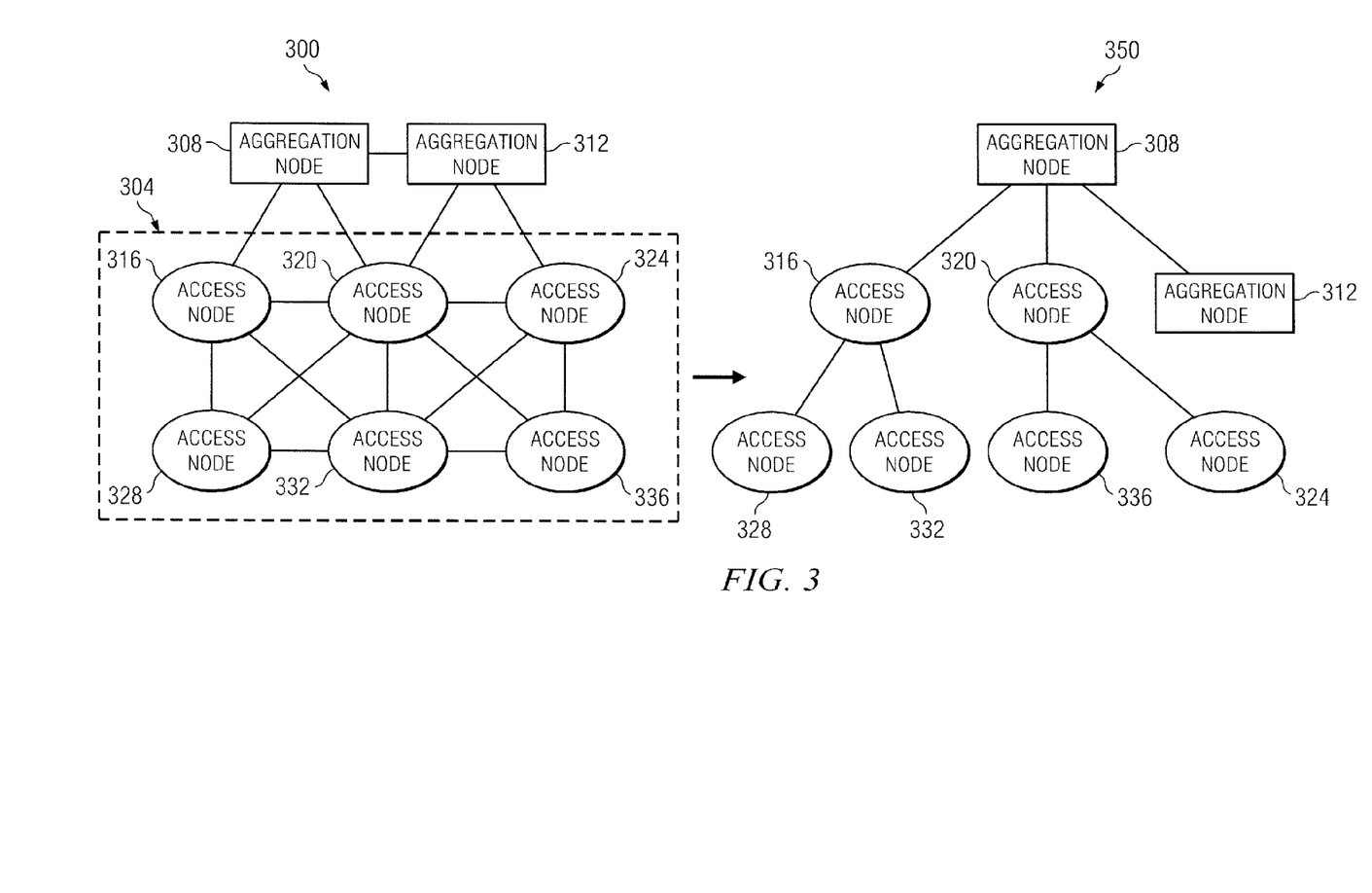
FIG. 3 illustrates an exemplary mesh network and corresponding spanning tree.

FIG. 3 depicts an exemplary network 300 and a corresponding spanning tree 350. In the illustration, exemplary network 300 is a mesh network in which one or more access nodes 316-336 of an access domain 304 are coupled to aggregation node 308 and/or 312. Exemplary network 300 comprises access domain 304 and aggregation nodes 308 and 312. In an embodiment, access domain 304 may correspond to an access domain (such as access domain 120) of FIG. 1 and aggregation nodes 308 and 312 may correspond to aggregation nodes 108 and 112 of FIG. 1. Corresponding spanning tree 350 comprises root node 308 and tree nodes 312-336. Spanning tree 350 may perform in a manner substantially similar to that of spanning tree 250. In order to avoid loops in network 300, access nodes implementing the spanning tree 350 may disable physical links to other access nodes that are not used to send data traffic, i.e., physical links that are not included in the least cost paths of the spanning tree 350.

Figure 4:
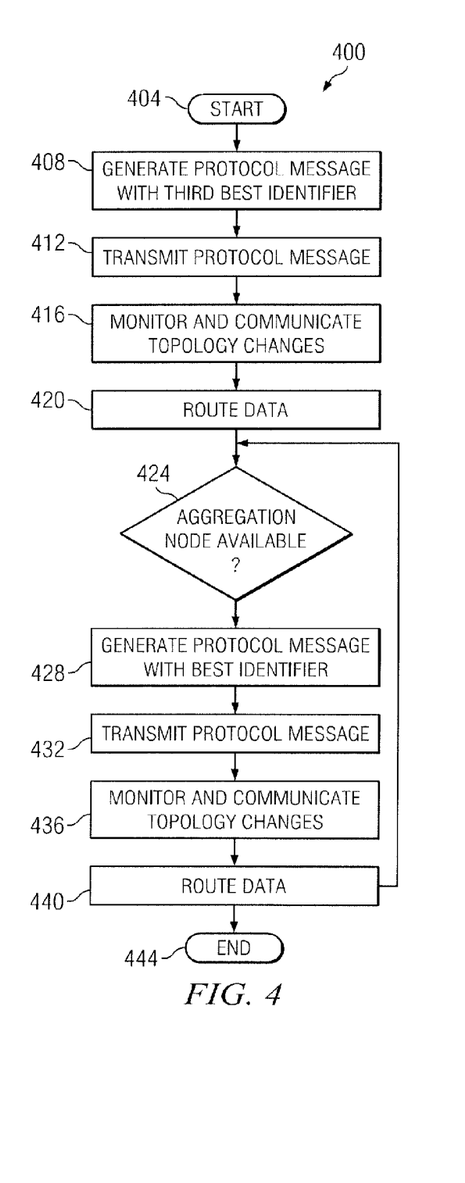
FIG. 4 illustrates an example flow of an exemplary aggregation node.

While networks 200 and 300 are a ring network and a mesh network, respectively, other networks may be star, fully connected, line, tree, bus, other suitable networks, or combinations thereof. Other suitable spanning trees may be implemented by access domains 204 and 304. FIG. 4 depicts an exemplary flow of an aggregation node 208 that participates in one or more spanning tree implementations. As described below, a second aggregation node 212 may have a different flow that complements the flow of aggregation node 208. The flow of aggregation node 208 begin at step 404.

At step 408, the aggregation node 208 may generate a protocol message. The protocol message may comprise a message that identifies the suitability of a node to serve as a root node of a spanning tree. In an embodiment, a protocol message may comprise a BridgeID. A BridgeID may be any suitable identifier, such as a physical identifier of an aggregation node 208 or a virtual identifier of an imaginary node (i.e., a virtual node) in aggregation network 104 that an access domain may regard as the root of a spanning tree. A protocol message may be included in a message that has the format of a spanning tree protocol message, such as a BPDU.

In certain embodiments, a protocol message may be generated independently of a spanning tree protocol instance. For example, the protocol message may be generated by the aggregation node 208, even though the aggregation node is not implementing a spanning tree protocol instance. Thus, the protocol message may be stateless, that is, it is not generated by a spanning tree state machine.

In an embodiment, the protocol message generated at step 408 may comprise a message that identifies the aggregation node 208 or the virtual node as a third best root node of a spanning tree 250 implemented by access domain 204. A third best root node may be a node that is the third most qualified node to serve as a root node of a spanning tree. In an embodiment, a protocol message may communicate a third lowest and/or third best BridgeID of any node of network 200. In an embodiment, aggregation node 208 may send the protocol message to a plurality of access domains, such as 116-124.

At step 412, the aggregation node 208 may transmit the protocol message to the access nodes 216-232 of access domain 204. In an embodiment, the protocol message may be transmitted periodically to one or more access domains (such as access domains 204 and/or 116-124).

At steps 416 and 420, aggregation node may monitor and communicate topology changes of the access domain 204 at step 416 and/or route data traffic at step 424. In some embodiments, these steps and step 412 may be performed continuously, in sequence, and/or simultaneously.

At step 424, the aggregation node 208 may or may not be available to perform aggregation and/or routing functions of a root node. If aggregation node 208 is unavailable to function as the root node, the flow may return to step 408. If the aggregation node is available to function as the root node, the aggregation node 208 may generate and transmit a different protocol message. In an embodiment, this protocol message may identify the aggregation node 208 or the virtual node as the best root node of spanning tree 250 implemented by access domain 204. In one embodiment, the message may communicate a BridgeID that is the lowest and/or best of the BridgeIDs of the network 200. In an embodiment, aggregation node 208 may periodically transmit this protocol message to one or more access domains (such as access domains 204 and/or 116-124).

At step 436, the aggregation node 208 may check the received traffic to determine whether a topology change has occurred in the access domain 204. In general, a topology change may occur when a link state changes, a node state changes (e.g., a node fails or becomes available again), or a node becomes unreachable through a current least cost path. In an embodiment, the aggregation node 208 may receive a spanning tree protocol message that indicates a topology change. The spanning tree protocol message may comprise a BPDU that has the topology change (TC) bit set. If the spanning tree protocol message indicates that a topology change has occurred in access domain 204, the aggregation node 208 may flush its local Media Access Control (MAC) table and communicate the topology change to affected nodes in the aggregation network 104, access domain 204, and/or other access domain.

In certain embodiments, the aggregation node 208 may communicate the topology change to upstream nodes (such as elements of aggregation network 104) by any suitable method, such as triggering Label Distribution Protocol (LDP) Media Access Control (MAC) withdrawals, sending BPDUs, communicating the change according to multiple I-SID registration protocol (MIRP), and/or other suitable method of propagating the topology change. In certain embodiments, the aggregation node 208 may communicate the topology change to downstream nodes, such as one or more access nodes of access domain 204, by transmitting a message that has the format of a spanning tree protocol message. This message may be included with a protocol message or it may be transmitted separately from a protocol message. When an access node receives the message, it adjusts to the topology change according to the spanning tree protocol. In an embodiment, the access node may perform a MAC flush by erasing MAC addresses associated with paths affected by the topology change.

In certain embodiments, a spanning tree protocol may operate such that a topology change is propagated from the root to each tree node through the least cost paths. Accordingly, in some networks, such as network 200, the aggregation node 208 functioning as the root node may communicate a topology change through aggregation node 212. In certain embodiments, aggregation node 212 does not implement a spanning tree protocol instance. Thus, aggregation node 212 may be configured to receive a topology change from aggregation node 208 and communicate the change to downstream nodes (such as access nodes 228 and 232 of spanning tree 270). In an embodiment, aggregation node 208 configures a pseudowire connection with aggregation node 212 and communicates the topology change across this connection.

A pseudowire connection may comprise a tunnel through which Ethernet frames pass. The pseudowire connection may comprise a path for untagged packets. In an embodiment, the data traffic may comprise tagged packets, and the spanning tree protocol messages may comprise untagged packets. After the topology change is communicated across the pseudowire connection, aggregation node 212 may communicate the topology change to downstream nodes 228 and 232 through a spanning tree protocol message, such as a BPDU with the TC bit set.

The aggregation node 208 may route data traffic at step 440. In an embodiment, the aggregation node 208 may receive data traffic from access nodes 216-232 of the access domain 204 and transmit the traffic to aggregation network 104. In some embodiments, the aggregation node may aggregate the data traffic with data traffic of other access domains (such as access domains 120 and 124). In an embodiment, the aggregation node 208 may route traffic between the access domains 116-124 and the aggregation network 104.

At some point, aggregation node 208 may fail. For example, at step 424, the aggregation node may sense that it is unavailable to function as the root node. Accordingly, the flow may return to step 408. Aggregation node 208 may later regain availability at step 424. In an embodiment, the aggregation node 208 may wait for a predetermined period of time before resending the protocol message identifying aggregation node 208 as the best root at step 428. In an embodiment, the predetermined period may comprise a set amount of time. In other embodiments, it may comprise the time for a step to be performed. For example, the aggregation node 208 may wait for a reboot of the aggregation node 208 to complete, for a line card to boot, for one or more connection requests to the aggregation network 104 to complete, and/or for other suitable tasks to be completed. After the predetermined period, transmission of the protocol message may resume at step 432.

At step 444, the flow may return to 424 or the flow may end. The flow may begin again at any suitable point of flow 400.

Figure 5:
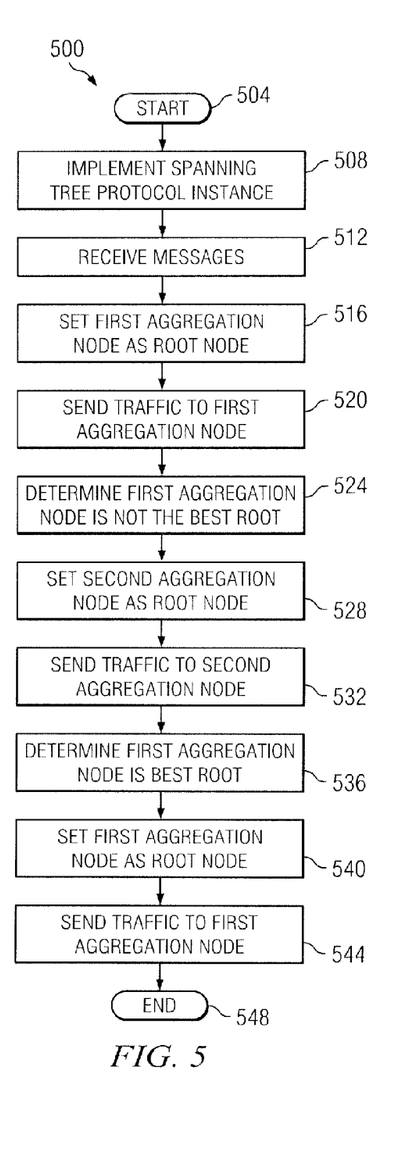
FIG. 5 illustrates an example flow of an exemplary access node.

FIG. 5 depicts an exemplary flow of an access node 216 that implements a spanning tree protocol instance. The steps shown do not necessarily occur in order. The flow begins at step 504. At step 508, access node 216 may implement an instance of a spanning tree protocol.

At step 512, the access node 216 may receive one or more messages, such as the protocol message identifying aggregation node 208 as the best root. In an embodiment, this protocol message may have the format of a spanning tree protocol message. Accordingly, the spanning tree protocol instance of access node 216 processes the protocol message as if it were a spanning tree protocol message. At step 516, the spanning tree protocol instance of access node 216 may identify and configure aggregation node 208 as the root node of spanning tree 250. After configuring the aggregation node 208 as the root node of spanning tree 250, the access node 216 may send data traffic to the aggregation node 208 at step 520.

At step 524, the spanning tree protocol instance of access node 216 may determine that the first aggregation node 208 is not the best root of spanning tree 250. For example, the access node 216 may stop receiving the protocol message identifying aggregation node 208 as the best root or may begin receiving the protocol message identifying aggregation node 208 as the third best root. In response to either of these, the spanning tree protocol instance of access node 216 may configure a different node as the root node of the spanning tree 250.

In an embodiment, aggregation node 212 may be configured to generate and transmit a protocol message identifying aggregation node 212 as the second best root of a spanning tree. In some embodiments, aggregation node 212 may send this protocol message to one or more access domains (such as access domains 204 and/or 116-124). The protocol message may be received at one or more access nodes 216 of access domain 204. Accordingly, if aggregation node 208 is unavailable, at step 528, access node 216 may configure aggregation node 212 as the root node of the spanning tree 250 and may send traffic to aggregation node 212 at step 532. Aggregation node 212 may also monitor and communicate topology changes and route data traffic. In some embodiments, these actions may be performed continuously, in sequence, and/or simultaneously.

At step 536, the spanning tree protocol instance of access node 216 may again determine that aggregation node 208 is the best root node, and may configure aggregation node 208 as the root at step 540. The access node may then resume transmitting traffic to the first aggregation node at step 544. The flow may end at step 548.

In some embodiments, some or all of the steps of flow 400 may be performed for other access domains, such as 120 and 124. Similarly, flow 500 may describe flows that occur at a plurality of access nodes of a plurality of access domains.

In some embodiments, data traffic of one or more access domains 116-124 may be load balanced between the aggregation nodes 108 and 112. In the embodiments, one or more access domains 116 may comprise a plurality of virtual local area networks (VLANs). A subset of the VLANs may configure aggregation node 108 as their root (i.e., the root of a spanning tree in which the VLAN participates), while another subset of the VLANs may configure aggregation node 112 as their root. In some embodiments, each access node of access domain 116 may have a configuration specifying the set of VLANs that are controlled by a first spanning tree protocol instance and the VLANs that are controlled by a second spanning tree protocol instance. Aggregation nodes 108 and 112 may also have a configuration with the same specification. In such an embodiment, the access nodes operate as if the aggregation nodes were each implementing a spanning tree protocol instance.

In some embodiments, the aggregation nodes 108 and 112 may be operable to aggregate traffic and communicate topology changes of access domains implementing Resilient Ethernet Protocol (REP). In such embodiments, the access domain may comprise one or more access nodes that each implement an instance of Resilient Ethernet Protocol (REP). REP may provide for notification of topology changes through spanning tree protocol messages, such as BPDUs. Accordingly, the aggregation nodes 108 and 112 may propagate topology changes to nodes of these access domains by generating and transmitting BPDUs. These BPDUs may be generated independently of a spanning tree protocol instance and may be stateless, that is, not generated by a spanning tree state machine.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The systems, apparatuses, and methods disclosed herein may utilize communication protocols and technologies to provide the communication sessions. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

Modifications, additions, or omissions may be made to the systems, apparatuses, and methods disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. The methods may include more, fewer, or other steps. Additionally, steps may be performed in any suitable order. As used in this document, "each" refers to each member of a set or each member of a subset of a set. A set may include zero, one, or more elements. A subset of a set may include zero, one, two or more, or all elements of the set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    generating, by a first aggregation node that does not implement one or more instances of a spanning tree protocol instance, a first protocol message identifying a best root node of a spanning tree implemented by an access domain;

transmitting, by the first aggregation node, the first protocol message to a plurality of access nodes of the access domain;
receiving data traffic from the plurality of access nodes, each access node of the plurality of access nodes implementing a spanning tree protocol instance that selects the best root node as a root node of the spanning tree; and
aggregating the data traffic and other data traffic of a plurality of access domains and transmitting the aggregated data traffic to an aggregation network.

2. The method of claim 1, the spanning tree further comprising:
a second aggregation node configured to transmit a second protocol message identifying the second aggregation node as a second best root node of the spanning tree.

3. The method of claim 1, further comprising:
receiving, at the first aggregation node, a spanning tree protocol message from an access node, the spanning tree protocol message identifying a topology change of the access domain; and
communicating the topology change to an element of the aggregation network.

4. The method of claim 1, further comprising:
receiving, at the first aggregation node, a spanning tree protocol message from an access node, the spanning tree protocol message identifying a topology change of the access domain; and
communicating the topology change to a first subset of the plurality of access nodes.

5. The method of claim 1, further comprising:
receiving, at the first aggregation node, a spanning tree protocol message from an access node, the spanning tree protocol message identifying a topology change of the access domain; and
forwarding the spanning tree protocol message over a pseudowire connection to allow a second aggregation node to communicate the topology change to a second subset of the plurality of access nodes.

6. The method of claim 1, further comprising:
sensing a failure of the best root node; and
transmitting a second protocol message from the first aggregation node, the second root message identifying the best root node as a third best root node of the spanning tree.

7. The method of claim 6, further comprising:
sensing a recovery of the best root node;
waiting for a predetermined period of time; and
transmitting the first protocol message from the first aggregation node.

8. The method of claim 1, the first protocol message identifying the first aggregation node or a virtual node of the aggregation network as the best root node.

9. The method of claim 1, further comprising:
receiving a subset of additional data traffic of a plurality of virtual local access networks, the additional data traffic of the plurality of virtual local access networks load balanced between the first aggregation node and a second aggregation node.

10. The method of claim 1, wherein the first protocol message is stateless and has a format of a spanning tree protocol message though the first aggregation node does not implement the spanning tree protocol instance.

11. An apparatus comprising:
a memory configured to store computer executable instructions; and
one or more processors coupled to the memory, the processors configured, when executing the instructions, to:
without implementing one or more instances of a spanning tree protocol, generate a first protocol message identifying a best root node of a spanning tree implemented by an access domain in communication with the one or more processors;
transmit the first protocol message from a first aggregation node to a plurality of access nodes of the access domain;
receive data traffic from the plurality of access nodes, each access node of the plurality of access nodes implementing a spanning tree protocol instance that selects the best root node as a root node of the spanning tree; and
aggregate the data traffic and other data traffic of a plurality of access domains and transmit the aggregated data traffic to an aggregation network.

12. The apparatus of claim 11, the spanning tree further comprising:
a second aggregation node configured to transmit a second protocol message identifying the second aggregation node as a second best root node of the spanning tree.

13. The apparatus of claim 11, the processors further configured to:
receive a spanning tree protocol message from an access node, the spanning tree protocol message identifying a topology change of the access domain; and
communicate the topology change to an element of the aggregation network.

14. The apparatus of claim 11, the processors further configured to:
receive a spanning tree protocol message from an access node, the spanning tree protocol message identifying a topology change of the access domain; and
communicate the topology change to a first subset of the plurality of access nodes.

15. The apparatus of claim 11, the processors further configured to:
receive a spanning tree protocol message from an access node, the spanning tree protocol message identifying a topology change of the access domain; and
forward the spanning tree protocol message over a pseudowire connection to allow a second aggregation node to communicate the topology change to a second subset of the plurality of access nodes.

16. The apparatus of claim 11, the processors further configured to:
sense a failure of the best root node; and
transmit a second protocol message from the first aggregation node, the second protocol message identifying the best root node as a third best root node of the spanning tree.

17. The apparatus of claim 11, the processors further configured to:
sense a recovery of the best root node;
wait for a predetermined period of time; and
transmit the first protocol message from the first aggregation node.

18. The apparatus of claim 11, the first protocol message identifying the first aggregation node or a virtual node of the aggregation network as the best root node.

19. The apparatus of claim 11, the processors further configured to:

receive a subset of additional data traffic of a plurality of virtual local access networks, the additional data traffic of the plurality of virtual local access networks load balanced between the first aggregation node and a second aggregation node.

20. The apparatus of claim 11, wherein the first protocol message is stateless and has a format of a spanning tree protocol message though the first aggregation node does not implement the spanning tree protocol instance.

21. A non-transitory computer-readable medium having computer-executable code, the computer-executable code executed by a computer to:
   without implementing one or more instances of a spanning tree protocol, generate a first protocol message identifying a best root node of a spanning tree implemented by an access domain;
   transmit the first protocol message from a first aggregation node to a plurality of access nodes of the access domain;
   receive data traffic from the plurality of access nodes, each access node of the plurality of access nodes implementing a spanning tree protocol instance that selects the best root node as a root node of the spanning tree; and
   aggregate the data traffic and other data traffic of a plurality of access domains and transmit the aggregated data traffic to an aggregation network.

22. The medium of claim 21 the spanning tree further comprising:
   a second aggregation node configured to transmit a second protocol message identifying the second aggregation node as a second best root node of the spanning tree.

23. The medium of claim 21, the medium further to:
sense a failure of the best root node; and
transmit a second protocol message from the first aggregation node, the second protocol message identifying the best root node as a third best root node of the spanning tree.

24. The medium of claim 21, the medium further to:
sense a recovery of the best root node;
wait for a predetermined period of time; and
transmit the first protocol message from the first aggregation node.

25. The medium of claim 21, the medium further to:
receive a spanning tree protocol message from an access node, the spanning tree protocol message identifying a topology change of the access domain; and
communicate the topology change to one or more of the following:
   an element of the aggregation network;
   a second aggregation node; and
   an access node of the plurality of access nodes.

26. The medium of claim 21, the medium further to:
receive a subset of additional data traffic of a plurality of virtual local access networks, the additional data traffic of the plurality of virtual local access networks load balanced between the first aggregation node and a second aggregation node.

27. The medium of claim 21, wherein the first protocol message is stateless and has a format of a spanning tree protocol message though the first aggregation node does not implement the spanning tree protocol instance.

* * * * *